US006500374B1

(12) United States Patent
Akioka et al.

(10) Patent No.: US 6,500,374 B1
(45) Date of Patent: Dec. 31, 2002

(54) METHOD OF MANUFACTURING BONDED MAGNETS OF RARE EARTH METAL, AND BONDED MAGNET OF RARE EARTH METAL

(75) Inventors: Koji Akioka, Matsumoto (JP); Hayato Shirai, Suwa (JP); Ken Ikuma, Suwa (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 09/043,896

(22) PCT Filed: Jun. 17, 1997

(86) PCT No.: PCT/JP97/02080

§ 371 (c)(1), (2), (4) Date: Feb. 26, 1999

(87) PCT Pub. No.: WO98/03981

PCT Pub. Date: Jan. 29, 1998

(30) Foreign Application Priority Data

Jul. 23, 1996 (JP) ............................................ 8-193761

(51) Int. Cl.[7] ............................ B29C 7/36; B29C 7/42; B29D 23/00; B29D 23/24

(52) U.S. Cl. ........... 264/148; 264/117.11; 264/DIG. 58; 428/35.8; 428/900

(58) Field of Search ................................ 428/900, 35.8; 264/148, 177.11, DIG. 58

(56) References Cited

U.S. PATENT DOCUMENTS

| | | | | |
|---|---|---|---|---|
| 4,562,019 A | | 12/1985 | Inoue | 264/24 |
| 5,217,302 A | * | 6/1993 | Jin-ping | 366/79 |
| 5,384,957 A | | 1/1995 | Mohri et al. | 29/895.32 |
| 5,888,417 A | * | 3/1999 | Akioka et al. | 252/62.55 |
| 5,888,418 A | * | 3/1999 | Ikuma et al. | 252/62.54 |

FOREIGN PATENT DOCUMENTS

| | | | |
|---|---|---|---|
| JP | 62179108 A | * | 8/1987 |
| JP | 05166656 A | * | 7/1993 |
| JP | 09052274 A | * | 2/1997 |
| SU | 1581588 A | * | 7/1990 |

OTHER PUBLICATIONS

Sakata, M; "Development of Extrusion Molded Nd–Fe–B Magnets", IEEE Translation Journal on Magnetics in Japan, vol. 8, No. 1, Jan. 1993, pp. 21–26.

JP 04 018710 A English Abstract Jan. 22, 1992, 1 sheet.

* cited by examiner

*Primary Examiner*—Sandra M. Nolan
(74) *Attorney, Agent, or Firm*—Harness, Dickey & Pierce, P.L.C.

(57) ABSTRACT

The present invention provides a method for manufacturing a rare-earth bonded magnet as follows: A compound 10, prepared by pelletizing a kneaded mixture of a rare-earth-bonded-magnet composition containing a rare-earth magnet powder, a binder resin and an antioxidant, is stored in a hopper 91, and fed into a cylinder 3 through a feeding pipe 92. Meanwhile, piston 81 is extended by driving an oil-hydraulic cylinder 8, and moved downward to compact the compound 10 fed into the cylinder 3 while gradually transferring the compound downward inside the cylinder 3. The cylinder 3 and a heating portion 41 are heated by heaters 5, the compound 10 passing therethrough is heated to become a melted material 11, and the melted material 11 is continuously extruded out from a die 4 in the downward-vertical direction, and is then cooled and solidified when passing through a tip portion 43, thus obtaining a molded body 12 of a rare-earth-bonded-magnet.

32 Claims, 1 Drawing Sheet

METHOD OF MANUFACTURING BONDED MAGNETS OF RARE EARTH METAL, AND BONDED MAGNET OF RARE EARTH METAL

TECHNICAL FIELD

The present invention relates to a method for manufacturing a rare-earth bonded magnet, and a rare-earth bonded magnet manufactured according to the method.

BACKGROUND ART

In general, a rare-earth bonded magnet is manufactured by molding a mixture or a kneaded mixture (compound) of a rare-earth magnetic powder and a binder resin (organic binder) into a desired magnet shape. For molding, compaction molding, injection molding or extrusion molding is employed.

In compaction molding, such a compound is placed into a mold and press-molded to obtain a green compact, and the compact is then heated to harden a thermosetting resin contained as a binder resin in the compound, thus manufacturing a bonded magnet. Since compaction molding is applicable to a composition including a smaller amount of the binder resin than that for other molding methods, the resin content in the obtained magnet can be reduced, and therefore, magnetic properties of the obtained magnet can be advantageously enhanced. In compaction molding, however, the variety of moldable magnet shapes is restricted, and productivity is low.

In injection molding, a compound is heat-melted so as to be sufficiently fluidized, and injected into a mold to be molded into a predetermined magnet shape. According to injection molding, versatility of shape can be high, and therefore, even irregular shaped magnets can be readily molded. In injection molding, however, since high fluidity is required of the melted compound, a large amount of binder resin must be added. The binder resin content in the obtained magnet therefore increases, which results in low magnetic properties.

In extrusion molding, a compound fed into an extruder is heat-melted, solidified by cooling in a die of the extruder, and extruded to obtain a long molded body. The molded body is then cut into magnet products having a desired length. According to extrusion molding, the advantages of both compaction molding and injection molding can be achieved. More specifically, the magnet shape can be relatively freely designed by appropriately selecting a die, namely, thin magnets and long magnets can be readily manufactured. Further, since such a high fluidity as is required of the melted compound in injection molding is not necessarily required, the amount of binder resin added to the compound can be smaller than that in injection molding, and therefore, the obtained magnet can exhibit enhanced magnetic properties.

Hitherto, screw extruders are used for extrusion molding. Such a screw extruder has a screw disposed in a heated cylinder, and raw material is forwarded while being kneaded by the rotation of the screw. Although such a screw extruder can extrude a compound continuously and quickly its generatable extruding pressure is relatively low (for example, approximately 200 to 500 $kg/cm^2$). Due to this, in order to cope with such a low extruding pressure, the viscosity of the heat-melted compound in the extruder should be to some extent adjusted to a low level.

As a measure for reducing the compound viscosity, for example, the material temperature (die temperature) may be raised. This measure may, however, be restricted from matter concerning the composition, properties and the like of the binder resin, and thermostability and oxidation resistance of the magnetic powder.

Further, although the viscosity of heat-melted compound can be reduced in proportion to the content of the binder resin in the compound, magnetic properties of the obtained magnet will be lowered when the content of the binder resin is increased, as described above. As a result, the advantages of extrusion molding cannot be sufficiently exhibited.

Moreover, in such extrusion molding, since the raw material is horizontally extruded, the molded body may be deformed under the influence of gravity in the cross-sectional direction of the body (shearing stress).

In particular, when a round-rod or hollow cylindrical rare-earth bonded magnet is manufactured by such extrusion molding, the roundness of the magnet is reduced. Additionally, rare-earth bonded magnets having plate or thinner shapes, which generally have low strength, are readily deformed by the action of gravity during the manufacturing process, and in such cases, the obtained magnets exhibit lowered dimensional accuracy.

The object of the present invention is to provide a rare-earth bonded magnet having superior magnetic properties and dimensional precision and a method for manufacturing the same while taking advantage of the benefits of extrusion molding.

DISCLOSURE OF INVENTION (1) The present invention provides a method for manufacturing a rare-earth bonded magnet, comprising extruding a rare-earth-bonded-magnet composition containing a rare-earth magnetic powder and a binder resin using an extruder, wherein the extruding direction by said extruder is substantially vertical.

(2) Preferably, said extruder is a ram extruder.

(3) Further, the present invention provides a method for manufacturing a rare-earth bonded magnet, comprising extruding a rare-earth-bonded-magnet composition containing a rare-earth magnetic powder, a binder resin and an antioxidant using an extruder, wherein the extruding direction by said extruder is substantially vertical.

(4) Preferably, said extruder is a ram extruder.

(5) Preferably, the total content of said binder resin and said antioxidant in said rare-earth-bonded-magnet composition is 10.0 to 22.4 vol %.

(6) Preferably, the content of said antioxidant in said rare-earth-bonded-magnet composition is 1.0 to 12.0 vol %.

(7) The content of said rare-earth magnetic powder in said rare-earth-bonded-magnet composition is 77.6 to 90.0 vol %.

(8) Moreover,the present invention provides a method for manufacturing a rare-earth bonded magnet containing a rare-earth magnetic powder and a binder resin, comprising:

a step of mixing a rare-earth magnetic powder and a binder resin to obtain a rare-earth-bonded-magnet composition;

an extrusion-molding step-in which said rare-earth-bonded-magnet composition is substantially vertically extruded using an upright extruder to obtain a long molded body; and a step of cutting said extrusion-molded long body, wherein, in said extrusion-molding step, said binder resin which has been melted or softened is solidified in the outlet portion of a die.

(9) Furthermore, the present invention provides a method for manufacturing a rare-earth bonded magnet containing a rare-earth magnetic powder and a binder resin, comprising:

a step of mixing a rare-earth magnetic powder and a binder resin;

a step of kneading the thus obtained mixture at a temperature equal or higher than the thermal deformation temperature or softening temperature of said binder resin to obtain a rare-earth-bonded-magnet composition;

an extrusion-molding step in which said rare-earth-bonded-magnet composition is substantially vertically extruded using an upright extruder to obtain a long molded body; and a step of cutting said extrusion-molded long body, wherein, in said extrusion-molding step, said binder resin which has been melted or softened is solidified in the outlet portion of a die.

(10) Preferably, said rare-earth-bonded-magnet composition comprises pellets or granules of the kneaded mixture.

(11) Preferably, said extruder is a ram extruder.

(12) Preferably, said rare-earth magnetic powder contains, as the main ingredients, rare-earth elements principally including Sm, and transition metals principally including Co.

(13) Preferably, said rare-earth magnetic powder contains, as the main ingredients, R (at least one element selected from rare-earth elements including Y), transition metals principally including Fe, and B.

(14) Preferably, said rare-earth magnetic powder contains, as the main ingredients, rare-earth elements principally including Sm, transition metals principally including Fe, and interstitial elements principally including N.

(15) Preferably, said rare-earth magnetic powder is a mixture comprising at least two rare-earth magnetic powders selected from those described in the above paragraphs (12), (13) and (14).

(16) Preferably, the extruding direction in said extrusion-molding step is downward-vertical.

(17) The present invention also provides a rare-earth bonded magnet characterized by being manufactured according to any one of the methods described in the above paragraphs (1) to (16).

(18) Preferably, said rare-earth bonded magnet has avoid ratio of 2 vol % or less.

(19) Preferably, said rare-earth bonded magnet has a round-rod shape or a hollow cylindrical shape, and a periphery Roundness of 5/100 mm or less [wherein, Roundness=(Maximum Outer Diameter−Minimum Outer Diameter)×1/2].

BEST MODE FOR CARRYING OUT THE INVENTION

Figure 1:
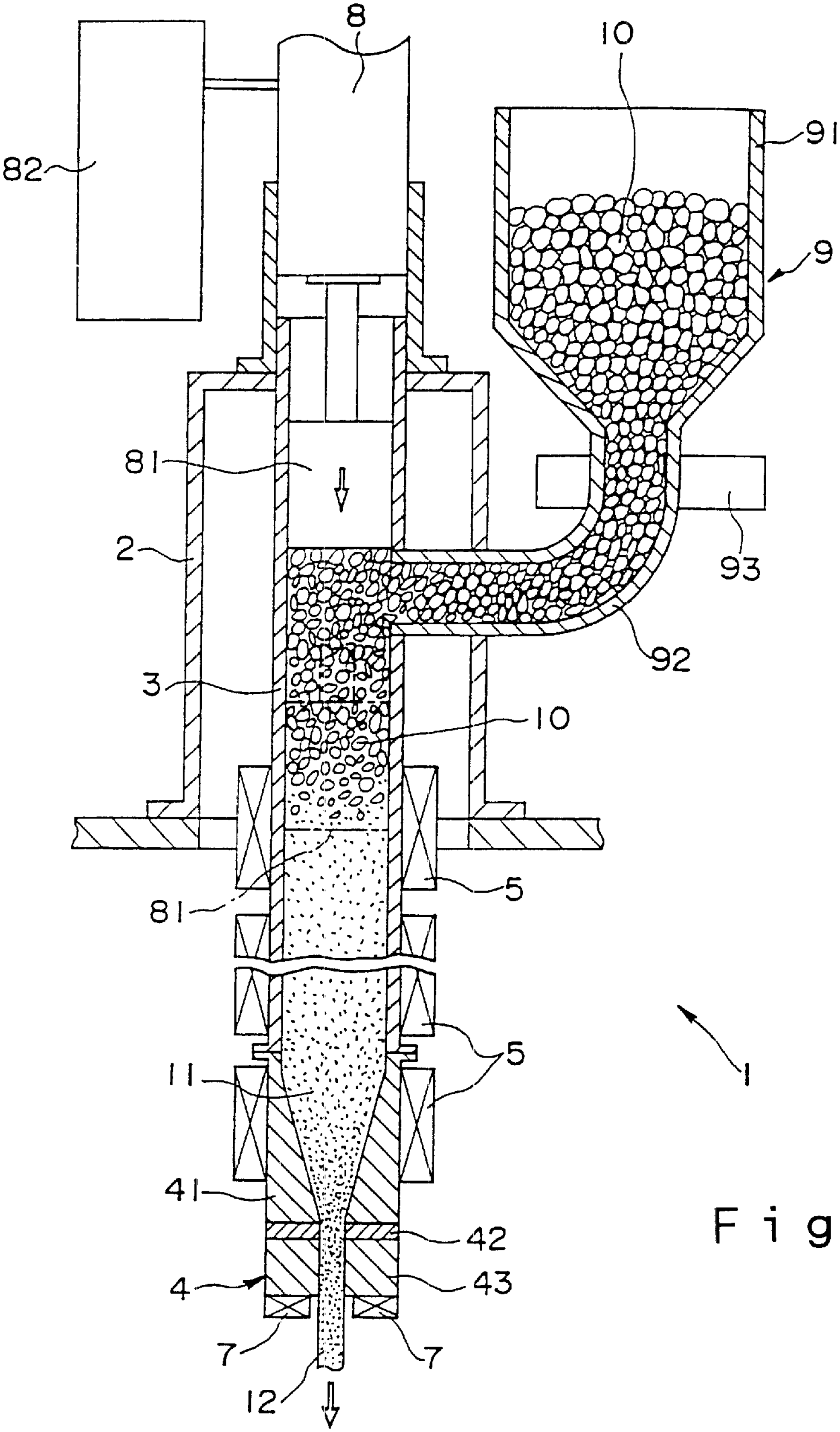
FIG. 1 is a sectional side view showing a structural example of an extruder used in the method for manufacturing a rare-earth bonded magnet according to the present invention.

The rare-earth bonded magnet and the method for manufacturing the rare-earth bonded magnet according to the present invention will be further described in detail below.

Initially, the method for manufacturing the rare-earth bonded magnet according to the present invention will be described. In the method for manufacturing the rare-earth bonded magnet according to the present invention, a rare-earth-bonded-magnet composition is initially prepared, and this rare-earth-bonded-magnet composition is then substantially vertically extruded by an upright extruder to form a rare-earth bonded magnet. The manufacturing steps will be described in order below.

<Preparation of Rare-Earth-Bonded-Magnet Composition>

The rare-earth-bonded-magnet composition used in the present invention contains a rare-earth magnetic powder and a binder resin, and preferably, further contains an antioxidant, as described below.

1. Rare-Earth Magnetic Powder

The rare-earth magnetic powder preferably comprises an alloy containing a rare-earth element and a transition metal, and more preferably, it is selected from those described in the below paragraphs [1] to [5].

[1] A magnet powder comprising an alloy which contains, as the main ingredients, rare-earth elements principally including Sm, and transition metals principally including Co (hereinafter referred to as Sm-Co-based alloy).

[2] A magnet powder comprising an alloy which contains, as the main ingredients, R (at least one element selected from rare-earth elements including Y), transition metals principally including Fe, and B (hereinafter referred to as R—Fe—B-based alloy).

[3] A magnet powder comprising an alloy which contains, as the main ingredients, rare-earth elements principally including Sm, transition metals principally including Fe, and interstitial elements principally including N (hereinafter referred to as Sm—Fe—N-based alloy).

[4] A magnet powder comprising an alloy which contains, as the main ingredients, R (at least one element selected from rare-earth elements including Y) and transition metals such as Fe, said magnet powder including magnetic phase of nanometer order (hereinafter referred to as nano-crystalline magnet).

[5] A mixture comprising at least two compositions of the above-described paragraph [1] to [4]. In this case, the obtained magnet can possess both of the benefits of the mixed magnetic powders, namely, a bonded magnet having superior magnetic properties can be readily obtained.

Typical examples of Sm—Co-based alloys include $SmCo_5$ and $Sm_2TM_7$ (herein TM represents a transition metal).

Typical examples of the R—Fe—B-based alloys include Nd—Fe—B-based alloys, Pr—Fe—B-based alloys, Nd—Pr—Fe—B-based alloys, Ce—Nd—Fe—B-based alloys, Ce—Pr—Nd—Fe—B-based alloys, and modified alloys thereof in which Fe is partly substituted with other transition metals such as Co and Ni.

A typical example of a Sm—Fe—N-based alloy is $Sm_2Fe_{17}N_3$ prepared by nitriding a $Sm_2Fe_{17}$ alloy.

Examples of rare-earth elements in the magnetic powder include Y, La, Ce, Pr, Nd, Pm, Sm, Eu, Gd, Tb, Dy, Ho, Er, Tm, Yb, Lu, and mish metals. The magnet powder may contain one or more of these elements. Further, examples of transition metals include Fe, Co and Ni, and the magnetic powder may contain one or more of these metals. As occasion demands, the magnetic powder may further contain elements such as B, Al, Mo, Cu, Ga, Si, Ti, Ta, Zr, Hf, Ag and Zn, in order to enhance magnetic properties.

Although the average particle diameter of the magnetic powder is not restricted, it preferably falls within approximately 0.5 to 50 μm, and more preferably, approximately 1 to 30 μm. Incidentally, the particle diameter can be determined by, for example, a F.S.S.S. (Fischer Sub-Sieve Sizer) method.

Further, the particle diameter distribution of the magnet powder may be either uniform or relatively dispensed, though a relatively dispensed (scattered) particle diameter distribution is preferred for achieving satisfactory moldability in extrusion molding with a small amount of binder resin. According to such a manner, the void ratio in the obtained bonded magnet can be reduced.

Incidentally, in the case of the above paragraph [5], magnet powders to be mixed may have different average particle diameters, respectively.

As a method for preparing the magnetic powder, any conventional methods can be employed without any special limitation. For example, an alloy ingot may be prepared by melting and casting, and then milled into appropriate particle sizes (and further sieved) to obtain a magnet powder. Alternatively, melt-spun ribbons (texture comprising fine polycrystals) may be prepared using a melt-spinning apparatus for amorphous alloy production, and then milled into appropriate particle sizes (and further classified) to obtain a magnet powder.

2. Binder Resin (Binder)

In the present invention, either thermoplastic resins or thermosetting resins can be used as the binder resin, though thermoplastic resins are preferred. The void ratio of the bonded magnet tends to be large in a case where a thermosetting resin is used as the binder resin, as compared to a case where a thermoplastic resin is used. Even in such a case, however, a bonded magnet having a reduced void ratio can be manufactured by an extrusion-molding process as described below.

Examples of thermoplastic resins include polyamides such as nylon 6, nylon 46, nylon 66, nylon 610, nylon 612, nylon 11, nylon 12, nylon 6–12, and nylon 6–66; liquid crystal polymers such as thermoplastic polyimides and aromatic polyesters; polyphenylene oxides; polyphenylene sulfides; polyolefins such as polyethylenes and polypropylenes; modified polyolefins; polycarbonates; polymethyl methacrylate; polyethers; polyether ether ketones; polyether imides; polyacetals; and copolymers, mixtures, and polymer alloys containing the above as the main ingredient. These resins may be used solely or in combination.

Among them, polyamides are preferably selected as a main ingredient since they achieve improved moldability and have high mechanical strength, and liquid crystal polymers and polyphenylene sulfides are also preferably selected as a main ingredient since they achieve a low thermal expansion coefficient and improved thermostability. Additionally, these thermoplastic resins have superior kneadability with magnetic powders.

There is advantageously a wider selection of thermoplastic resins including resins of various types and copolymerizedresins. In other words,the thermoplastic resin to be used can be selected in accordance with the situational importance such as moldability, thermostability and mechanical strength.

Meanwhile, examples of thermosetting resins include epoxy resins, phenol resins, urea resins, melamine resins, polyester (unsaturated polyester) resins, polyimide resins, silicone resins, and polyurethane resins. These resins may be used solely or in combination.

Among them, epoxy resins, phenol resins, polyimide resins and silicone resins are preferred, and epoxy resins are especially preferred, since they achieve markedly-improved moldability and have high mechanical strength and superior thermostability. Additionally, these thermoplastic resins have superior kneadability with magnetic powders, and exhibit excellent uniformity when kneaded with the same.

Incidentally, the thermosetting resin to be used (not cured) may either liquid or solid (powder) at room temperature.

3. Antioxidant

The antioxidant is an additive added to the rare-earth-bonded-magnet composition during the step of kneading or the like in order to prevent degeneration of the composition due to oxidative deterioration of the rare-earth magnet powder or oxidation of the binder resin (such degeneration may be caused by the catalytic action of the metal component in the rare-earth magnetic powder). The addition of the antioxidant contributes to improving magnetic properties of the magnet by preventing oxidation of the rare-earth magnetic powder, and to improving thermostability of the rare-earth-bonded-magnet composition during the steps of kneading and molding. As a result, satisfactory moldability can be achieved even with a smaller amount of binder resin.

Since the antioxidant is vapored or deteriorated during the intermediate steps such as kneading or molding of the rare-earth magnetic composition, the manufactured rare-earth bonded magnet contains a residue of the antioxidant. Accordingly, the antioxidant content in the rare-earth bonded magnet generally is, for example, approximately 10 to 90%, and in particular, approximately 20 to 80%, relative to the content of the antioxidant in the rare-earth magnetic composition.

Any conventional antioxidant can be used so long as it can prevent or inhibit oxidation of the rare-earth magnet powder and other ingredients. Examples of preferred antioxidants include amines, amino acids, nitrocarboxylic acids, hydrazines, cyanides and sulfides which act on metallic ions, especially Fe components, to form chelate compounds. Needless to say, the kind, the composition and other properties of the antioxidant are not limited to the above.

The content (addition amount) of the rare-earth magnetic powder in the rare-earth-bonded-magnet composition is preferably approximately 77.6 to 90.0 vol %, more preferably approximately 79.0 to 88.0 vol %, and further preferably approximately 82.1 to 86.0 vol %. With a too small content of the magnet powder, magnetic properties [especially magnetic energy product $(BH)_{max}$] cannot be improved. Meanwhile, with an excessive content of the magnetic powder, the content of the binder is relatively reduced. As a result, the fluidity of the composition during the extrusion-molding step becomes low, and therefore, molding of the composition becomes difficult or impossible.

Further, the contents (addition amounts) of the binder resin and the antioxidant in the rare-earth-bonded-magnet composition should be altered depending on the kinds and compositions of the binder resin and the antioxidant, the molding conditions, such as the molding temperature and pressure, the shape and size of the molded body, and others. Preferably, in order to improve magnetic properties of the obtained rare-earth bonded magnet, the amount of the binder resin contained in the rare-earth-bonded-magnet composition should be as small as possible within a range where the composition can be kneaded and molded.

When the rare-earth-bonded-magnet composition contains an antioxidant, the content of the antioxidant is preferably approximately 1.0 to 12.0 vol %, and more preferably, approximately 3.0 to 10.0 vol %. In this case, the amount of the antioxidant relative to the amount of the binder resin is preferably approximately 10 to 150%, and more preferably, 25 to 90%.

Incidentally, in the present invention, the amount of the antioxidant may be lower than the lower limit of the above-described range, and needless to-say, the addition of an antioxidant is not essential.

When the amount of the binder resin in the rare-earth-bonded-magnet composition is too small, the viscosity of the composition becomes high during the kneading step, and the torque during kneading is increased. As a result, exothermic reaction occurs, and the oxidation of the magnetic powder and other ingredients can be thereby promoted. When the amount of the antioxidant or the like is small as well, the oxidation of the magnetic powders and other ingredients can not be sufficiently inhibited, the moldability of the composition becomes low due to a viscosity increase or the like in the kneaded mixture (melted resin), and therefore, a magnet having a low void ratio and high mechanical strength cannot be obtained. On the other hand, when the amount of the binder resin is excessive, although the moldability of the composition is satisfactory, the magnetic properties of the obtained magnet is lowered due to the excessive content of the binder resin in the magnet.

Meanwhile, when the amount of the antioxidant in the rare-earth-bonded-magnet composition is too small, a sufficient antioxidant effect cannot be achieved, and particularly in a case where the content of the magnetic powder is large, the oxidation of the magnetic powder and the like cannot be sufficiently inhibited. On the other hand, when the amount of the antioxidant is excessive, the relative amount of the binder resin decreases, and the mechanical strength of the molded article is lowered.

As described above, when the amount of the binder resin is relatively large, the amount of the antioxidant can be restricted. Conversely, when the amount of the binder resin is small, the amount of the antioxidant should be increased.

Based on the above, the total amount of the binder resin and antioxidant in the rare-earth-bonded-magnet composition is preferably 10.0 to 22.4 vol %, more preferably 12.0 to 21.0 vol %, and further preferably 14.0 to 17.9 vol %. When the total amount falls within such a range, the fluidity and moldability of the composition during extrusion-molding can be improved, prevention of the magnetic powder and others from oxidation can be promoted, and therefore, a magnet having a low void ratio, high mechanical strength and high magnetic properties can be obtained.

As occasion demands, the rare-earth-bonded-magnet composition may further contain a plasticizer such as stearate salts and fatty acids for plasticization of the binder resin, a lubricant such as silicone oils, waxes, fatty acids, alumina, silica, titania and other inorganic lubricants, and other additives such as a molding activator.

Addition of a plasticizer preferably improves the fluidity of the composition during the molding step, and the same properties can be thereby achieved with a smaller amount of the binder resin. A similar effect can also be achieved by the addition of a lubricant. Preferably, the amount of the plasticizer is 0.1 to 2.0 vol %, and the amount of the lubricant is 0.2 to 2.5 vol %.

<Kneading of Rare-earth-bonded-magnet Composition>

The rare-earth-bonded-magnet composition may be subjected to the following extrusion-molding step in the form of a mixture prepared by mixing the above-described rare-earth magnet powder, binder resin, antioxidant and other additives using a mixer or agitator such as a Henshel mixer or a twin-cylinder mixer. Preferably, in the present invention, a kneaded mixture (compound) is prepared by further kneading such a mixture, and such a compound is then subjected to extrusion-molding.

More specifically, a rare-earth-bonded-magnet composition (mixture) containing a rare-earth magnetic powder, a binder resin, an antioxidant and other additives is sufficiently kneaded using a kneader or the like such as a roll mil and a twin screw extruder to obtain a kneaded mixture.

At this time, the kneading temperature is appropriately determined depending on the kind and others of the used binder resin, and preferably, it is higher than the thermal deformation temperature or softening temperature (softening point or glass-transition point) of the binder resin. By satisfying this, the kneading efficiency can be improved, the mixture can be uniformly kneaded within a shorter time period. Further, since the mixture is kneaded while the viscosity of the binder resin is lowered, the particles of the rare-earth magnetic are surrounded with the binder resin, and the void ratio in the obtained bonded magnet can be reduced.

For example, when the binder resin is a thermoplastic resin such as a polyamide, the preferred kneading temperature is approximately 150 to 350° C., and the preferred kneading time period is approximately 5 to 60 min.

Preferably, the obtained kneaded mixture is further pelletized, namely, made into blobs or granules (hereinafter referred to as "pellets"), and subjected to the following extrusion-molding. In this case, the grain diameter of the pellets fall within, for example, approximately 2 to 12 mm.

<Extrusion-Molding>

Extrusion-molding can be carried out according to vertical extrusion-molding.

FIG. 1 is a sectional view showing a structural example of an upright extruder used in the present invention. The upright extruder 1 shown in FIG. 1 is an upright ram extruder, and comprises a supporting frame 2, a metal cylinder 3 supported by the frame 2 and vertically extended, a die 4 connected to the lower end of the cylinder 3, heaters 5 disposed on the outer periphery of a heating portion 41 in the cylinder 3 and the die 4, a cooling apparatus 7 disposed at the lower end of the die 4, an oil-hydraulic cylinder 8 equipped with a piston 81 reciprocative in the cylinder 3, an oil-hydraulic driving unit 82 which drives the oil-hydraulic cylinder 8, and a raw-material feeding means 9 which feeds a raw material (rare-earth-bonded-magnet composition) into the cylinder 3.

The die 4 is joined to the heating portion 41 through a thermally insulating portion 42, the inner diameter of the heating portion being downward convergent, and the die has a tip portion 43 (outlet portion of the die) constituting a cooling gate.

A molded body 12 is substantially vertically extruded through the die 4.

Further, the raw-material feeding means 9 comprises a hopper 91 in which a rare-earth-bonded-magnet composition (compound 10) prepared by, for example, pelletizing the aforementioned kneaded mixture is stored, a feeding pipe 92 connecting the hopper 91 to the inside of the cylinder 3, and a vibrator 93 disposed around an intermediate portion of the feeding pipe 92. Optionally, a non-illustrated valve may be disposed in an intermediate portion of the feeding pipe 92 in order to control the amount of the fed compound 10.

Incidentally, though not illustrated, a coil may be disposed near the die 4 or the cooling apparatus 7 in order to longitudinally, laterally or radially apply an alignment field (for example, approximately 10 to 20 kOe) to the extruded material.

In such a ram extruder 1, the inner diameter of the cylinder 3 is, for example, approximately 20 to 100 mm, the ratio L/D of the entire length L (effective length) of the cylinder 3 to the inner diameter D is approximately 10 to 30.

Next, an example process of extrusion-molding using such a ram extruder 1 will be illustrated below.

The compound 10 in the hopper 91 is fed into cylinder 3 through the feeding pipe 92. At this time, the feeding pipe 92 and others are vibrated by operating the vibrator 93, so that the compound 10 is smoothly fed.

Meanwhile, the oil-hydraulic cylinder 8 is driven by the oil-hydraulic driving unit 82 in accordance with a pre-programmed pattern. When the piston 81 is extended and moved downward by driving the oil-hydraulic cylinder 8, the compound 10 fed into the cylinder 3 is compacted and gradually transferred downward inside the cylinder 3.

For example, the piston 81 of the oil-hydraulic cylinder 8 is extended over a period of approximately 5 to 20 sec., maintained in the most extended state for approximately 3 to 10 sec., then retracted over a period of approximately 5 to 15 sec., and this cycle is repeated.

The heating portion 41 in the cylinder 3 and the die 4 is heated by the heaters 5 to a predetermined temperature. Due to this, while being transferred downward in the cylinder 3, the compound 10 is heated to a temperature (for example, 120 to 350° C.) higher than the melting temperature of the binder resin (thermoplastic resin) in the compound 10, and is thereby melted. The compound 10 is made to be a melted material 11 having a low viscosity and improved fluidity, and voids therein are removed by compaction.

Further, the melted material 11 derived from the compound 10 is continuously extruded through the die 4 to be molded into a predetermined shaft At this time, although a relatively high extruding pressure can be applied, the entire extruding pressure is preferably 30 tons or less, and more preferably, 20 tons or less.

Incidentally, the extrusion rate is preferably approximately 0.1 to 20 mm/sdc., and more preferably, 0.2 to 10 mm/sec.

As described above, an increased content of the rare-earth magnetic powder in the rare-earth-bonded-magnet composition (compound 10), results in an increased viscosity and lowered fluidity of the melted material 11, and necessarily requires a high extruding pressure. Since such ram extrusion employed in this embodiment can be performed under a high extrusion pressure as described above, it can be advantageously employed for manufacturing a bonded magnet having a large content of the rare-earth magnetic powder. In addition, since a high extrusion pressure promotes removal of bubbles, the void ratio of the rare-earth bonded magnet can be reduced even if the magnet contains a large amount of a rare-earth magnetic powder, and therefore, the magnetic properties can be markedly improved.

Moreover, although thermostable thermoplastic resins such as liquid-crystal polymers and polyphenylene sulfides require a higher pressure for molding than nylon-based resins, such thermostable resins can be readily used if a ram extruder is employed.

The material extruded through the heating portion 41 on the die 4 is cooled while it passes the tip portion 43, and the binder resin is thereby solidified. According to this manner, a long molded body 12 is continuously manufactured. The molded body 12 is then appropriately cut to obtain rare-earth bonded magnets having desired shapes and sizes.

Incidentally, when the binder resin is a thermosetting resin, the compound is heated in the heating portion 41 on and around the cylinder 3 and the die 4 under conditions at a temperature which is higher than the softening point of the thermosetting resin but which does not cure the resin, then cooled in the tip portion 43 of the die to room temperature or a temperature higher than the softening point, extruded out from the die in such cooled state to form a molded article,. and the molded article is subjected to thermosetting. Thermosetting may be performed either before or after the cutting step. Alternatively, the compound may be preformed in the heating portion 41, further heated in the tip portion 43 to cure the resin component, then extruded out from the die in this state, and cut to obtain molded articles. At this time, post-curing may be performed before or after the cutting step in order to sufficiently cure the resin component.

Further, a mere mixture of a rare-earth-bonded-magnet composition as described above may be stored in the hopper 91 of the material-feeding means 9, and fed into the cylinder 3.

The cross-sectional shape of the manufactured rare-earth bonded magnet is determined according to selection of the extrusion-outlet shape of the die 4 When the die 4 is constituted with a single die, bonded magnets having the shapes of plates or rods such as round rods can be obtained. When the die 4 is constituted with an outer die and an inner die, hollow bonded magnets such as those having hollow cylindrical shapes can be obtained. Additionally, according to appropriate selection of the extrusion-outlet shape of the die 4, even thin magnets or magnets having deformed sections can be readily manufactured. Moreover, bonded magnets of any length, including flat ones through long ones, can be manufactured by adjusting the cut length for the molded body 12.

Although ram extrusion-molding has been illustrated above as a typical example, the scope of the present invention is not limited to the above. For example,screw extrusion-molding using an upright screw extruder may also be employed. Such a screw extruder has a structure in which a continuously rotatable screw is disposed instead of the oil-hydraulic cylinder 8 in the extruder shown in FIG. 1, and can continuously extrude and mold a material in the vertical direction.

In such a screw extruder, for example, the inner diameter At of the cylinder is approximately 15 to 70 mm, and the ratio L/D of the cylinder effective length L to the inner diameter D is approximately 15 to 40.

As described above, in the present invention, the extrusion direction of the extruder is substantially vertical. Although the direction may be upward-vertical or downward-vertical, downward-vertical is preferred as illustrated. Since the molded body extruded in the vertical direction is subjected to the action of gravity in its longitudinal direction but not in its cross-sectional direction, rare-earth bonded magnets can be obtained in extremely high dimensional accuracy without shape irregularity.

In particular, when a round-rod- or hollow-cylinder-shaped rare-earth bonded magnet (namely, having a round cross-sectional shape) is manufactured, improved roundness can be achieved. Also, in manufacturing a plate-shaped or thin bonded magnet, which are readily deformed, markedly improved dimensional precision can be achieved since deformation due to the influence of gravity can be prevented.

Rare-earth bonded magnets are frequently used in rotating equipment such as hard drives and CD-ROM drives, and therefore, many of such magnets have thin and hollow cylinder shapes. Accordingly, circularity of such a hollow cylinder shape is an important factor in the manufacture of magnets.

According to the above-described manufacturing method, the versatility of the magnet shape can be wide, molding of a compound containing a smaller amount of binder resin can be achieved, and rare-earth bonded magnets having superior magnetic properties and dimensional precision can be manufactured. Further, continuous manufacturing can be achieved, namely, mass-production of rare-earth bonded magnets is possible.

As a matter of course, kneading conditions, molding conditions and others are not limited to the above-description.

In the rare-earth bonded magnet of the present invention manufactured according to the above-described method, the content of the rare-earth magnetic powder is preferably approximately 77.6 to 90.0 vol %, more preferably approximately 79.0 to 88.0 vol %, and further preferably 82.1 to 86.0 vol %.

Further, the void ratio of the rare-earth bonded magnet is preferably less than 2 vol %, and more preferably, less than 1.5 vol %. With a void ratio above 2 vol %, mechanical strength and corrosion resistance of the magnet may be reduced depending on the composition and the content of the magnetic powder, the composition of the binder resin, and other conditions.

Due to an appropriate composition of the magnetic powder, a higher content of the magnetic powder and other specific factors, the rare-earth bonded magnet of the present invention can exhibit superior magnetic properties even if it is an isotropic magnet or an anisotropic magnet.

When obtained by molding without a magnetic field, the rare-earth bonded magnet of the present invention preferably has a magnetic energy product $(BH)_{max}$ of 8 MGOe or more, and more preferably, 10 MGOe or more. Meanwhile, when obtained by molding under a magnetic field, the bonded magnet preferably has a magnetic energy product $(BH)_{max}$ of 12 MGOe or more, and more preferably, 14 MGOe or more.

Incidentally, the shape and size of the rare-earth bonded magnet according to the present invention are not especially limited. Any shape such as that of a round rod, prism, hollow cylinder, arch, flat plate or curved plate is moldable. Also, any size including large sizes through extremely small sizes is practicable.

In particular, in a case of a round-rod-shaped or hollow-cylinder-shaped rare-earth bonded magnet, its roundness [=(Maximum Outer Diameter−Minimum Outer Diameter)×1/2] is preferably 5/100 mm or below, and more preferably, 3/100 mm or below.

In the rare-earth bonded magnet of the present invention, particularly in a case of a round-rod-shaped or hollow-cylinder-shaped rare-earth bonded magnet, its straightness (=Maximum Variation in Cross-sectional Width per 100 mm Magnet Length) is preferably 5 mm or below, and more preferably, 3 mm or below.

The present invention will be further described with reference to examples below.

EXAMPLES 1 to 13

Seven rare-earth magnet powders in accordance with the below-described compositions (1) to (7), respectively, six binder resins A to F set forth below, a hydrazine-based antioxidant (chelating agent), a fatty acid as a lubricant, and a metallic soap as a plasticizer were prepared, and uniformly mixed using a mixer according to the predetermined combinations and quantities shown in Table 1.

(1) melt-spun $Nd_{12}Fe_{78}Co_4B_6$ powder (average diameter: 18 μm)

(2) melt-spun $Nd_8Pr_4Fe_{82}B_6$ powder (average diameter: 17 μm)

(3) melt-spun $Nd_{12}Fe_{82}B_6$ powder (average diameter: 19 μm)

(4) Nano-crystalline $Nd_{5.5}Fe_{66}B_{18.5}Co_5Cr_5$ powder (average diameter: 15 μm)

(5) $Sm(CoO_{0.604}Cu_{0.06}Fe_{0.32}Zr_{0.016})_{8.0}$ powder (average diameter: 21 μm)

(6) Anisotropic $Nd_{13}Fe_{69}Co_{11}B_6Ga_1$ powder according to a HDDR method (average diameter: 28 μm)

(7) $Sm_2Fe_{17}N_3$ powder (average diameter: 2 μm)

Thermoplastic Resins:

A. Polyamide (nylon 12) (thermal deformation temperature: 145° C., melting point: 175° C.)

B. Liquid crystal polymer (thermal deformation temperature: 180° C., melting point: 280° C.)

C. Polyphenylene sulfide (PPS) (thermal deformation temperature: 260° C., melting point: 280° C.)

D. Polyamide copolymer (nylon 6–12) (thermal deformation temperature: 46° C., melting point: 145° C.)

Thermosetting Resins:

E. Epoxy resin (softening temperature: 80° C., curing temperature: 120° C. or higher)

F. Polyimide resin (softening temperature: 95° C., curing temperature: 180° C. or higher)

Next, each mixture having the composition shown in Table 1 was sufficiently kneaded using a screw kneader (apparatus a) or a kneader (apparatus b) to obtain a kneaded material (compound) of a rare-earth-bonded-magnet composition. The kneading conditions are shown in Tables 2 and 3.

Each compound was then ground and classified into pellets having an average diameter of 3 to 5 mm.

The thus-obtained pellets were subjected to extrusion-molding in the vertical (downward) direction using an upright ram extruder shown in FIG. 1 or a screw extruder to manufacture rare-earth bonded magnets. In the cases where the powder (5), (6) or (7) was used, an exciting coil (non-illustrated) is disposed near the extrusion-outlet of the ram extruder such that molding can be performed under a magnetic field.

Other extrusion-molding conditions are shown in Tables 2 and 3.

Each molded article extruded out while being solidified was cut into pieces having predetermined lengths (within a range from 1 to 500 mm) using a cutter. Incidentally, cutting at a length of 100 mm was particularly performed in order to obtain samples for measuring straightness.

In each case where a thermosetting resin was used as a binder resin, the compound was heated in the tip portion of the die to the thermosetting temperature and extruded, and the thus-obtained molded article was then subjected to post-curing (Example 12). Alternatively, the compound was cooled in the tip portion of the die to a temperature below the softening temperature of the resin and extruded in the thus-solidified state to obtain a molded article, and a curing treatment was performed (Example 13). The post-curing treatment and the curing treatment were performed under the conditions at 120 to 250° C. for 30 to 300 min., respectively. According to the above-described processes, rare-earth bonded magnets were obtained.

EXAMPLES 14 and 15

Rare-earth bonded magnets were manufactured in a manner similar to Examples 1 to 13 above, except that the mixtures having the compositions shown in Table 1 were directly fed into the ram extruder, respectively.

The composition, density, void ratio, roundness and straightness (indexes representing dimensional precision), and other properties of each magnet manufactured based on the conditions shown in the tables are shown in Tables 4, 5, 6 and 7.

$$\text{Roundness}=(\text{Maximum Outer Diameter}-\text{Minimum Outer Diameter})\times 1/2\ [\text{mm}] \quad (1)$$

Further, the item "straightness" in Tables 4 to 7 is an index for dimensional accuracy of a sample, and was determined as follows. A sample cut into a length of 100 mm was placed on a horizontally flat surface, gaps generated by curvature and waviness of the sample between the sample and the flat surface were measured, and the maximum of the measured values was regarded as the straightness of the sample. Samples having a smaller straightness value are more ideally straight.

The item "corrosion resistance" in Tables 4 to 7 shows the results of accelerated tests performed on the obtained rare-earth bonded magnets in a constant-temperature constant-humidity chamber under the conditions of 80° C. at 90% RH. The corrosion resistance was evaluated with four grades, i.e., ◎(excellent), ○(good), Δ(not so good) and X(no good) based on the time until corrosion was observed.

COMPARATIVE EXAMPLES 1 and 2

Rare-earth bonded magnets were manufactured as follows: Each mixture having the composition shown in Table 1 was pelletized in a manner similar to Example 1 and other examples; the thus-obtained pellet was then subjected to extrusion-molding in the horizontal direction using a horizontal ram extruder to obtain a rare-earth bonded magnet.

The modified manufacturing conditions for obtaining each magnet, the composition, circularity, straightness, and other properties of the magnet are shown in Table 7.

COMPARATIVE EXAMPLES 3, 4 and 5

Rare-earth bonded magnets were manufactured as follows: Each mixture having the composition shown in Table 1 was pelletized in a manner similar to Example 1 and other examples; the thus-obtained pellet was then subjected to extrusion-molding in the horizontal direction using a horizontal screw extruder to obtain a rare-earth bonded magnet.

Hereupon, the entire length (effective length) of the cylinder in the horizontal screw extruder was 900 mm, and the inner diameter of the cylinder was 30 mm. Other extrusion-molding conditions using this screw extruder are shown in Table 3.

The modified manufacturing conditions for obtaining each magnet, the composition, roundness, straightness, and other properties of the magnet are shown in Table 7.

Additionally, linear expansion coefficients were measured for round rods which were formed with the compound used in Examples 2, 3 and 12 and Comparative Example 3, respectively, in a size of 5 mm in diameter and 10 mm in length.

The results are shown in Table 8. The linear expansion coefficient described in Table 8 is a value under the condition from 125 to 150° C.

<Review of the Results>

In Examples 1 to 15 where an upright extruder was used, any rare-earth bonded magnet could be readily and smoothly manufactured in accordance with the desired design with high productivity, and in addition, at high yields.

Further, as is obvious from the tables, in Examples 3 to 15 where a ram extruder was used, since the extrusion pressure could be set to be high and the extrusion direction was vertical, all of the obtained rare-earth bonded magnets had a low void ratio, exhibited superior moldability, magnetic properties (maximum magnetic energy product) and corrosion resistance, and in addition, exhibited form stability, and high circularity and straightness (dimensional precision).

Incidentally, in Examples 1 to 13 where pelletized rare-earth-bonded-magnet compositions were used, the void ratio was lower, though only slightly, and dimensional precision such as roundness and straightness was higher, as compared to Examples 14 and 15 where mere mixtures of rare-earth-bonded-magnet compositions were used. Further, obviously from a decreasing tendency observed in the molding pressure, the extruding rate can be raised, though it depends on the magnet shape and the composition of the compound.

In contrast, in Comparative Examples 1 and 2, since the extrusion direction was horizontal, the manufactured rare-earth bonded magnets exhibited low circularity and straightness, namely, low dimensional accuracy, as compared to the aforementioned examples, and showed a tendency to be irregular in shape.

Meanwhile, in Comparative Examples 3 to 5, since the extruding pressure was lower than that in each of the aforementioned examples, the content of the magnetic powder in the rare-earth-bonded-magnet composition could not be set to be large. Accordingly, the manufactured rare-earth bonded magnets had higher void ratios and low magnetic properties than those of each of the aforementioned examples. In a case where the content of the magnetic powder was large, the shape of the magnet was restricted even if such a compound was moldable. Therefore, for example, a thin walled ring-shaped magnet cannot be achieved.

Additionally, since the extruding direction was horizontal, roundness and straightness, i.e. dimensional accuracy, were low, and a tendency to be irregular in shape was observed similar to Comparative Examples 1 and 2.

Moreover, as is obvious from Table 8, according to ram extrusion-molding, a resin which requires a high molding pressure but which has a low thermal expansion coefficient can be used, and therefore, a high-performance magnet which contains a high-volume magnetic powder and exhibits superior dimensional precision and thermostability can be manufactured.

As described above, according to the present invention, a rare-earth bonded magnet exhibiting superior moldability, superior corrosion resistance, a low linear expansion coefficient, high mechanical strength, excellent magnetic properties and high dimensional precision can be obtained with a lower content of the binder resin while taking advantage of the benefits of extrusion-molding such as wide versatility on magnet shape and size, and applicability to mass-production.

In particular, according to ram extrusion-molding, the above advantages will be marked since the extruding pressure can be set to be high.

Industrial Applicability

The present invention has the above-described advantages, and therefore, is applicable to, for example, various motors and solenoids such as stepping motors and brushless motors, and various permanent magnets such as those for actuators, sensors in cars or the like, finders in VTRs or the like, measuring instruments, and the like.

TABLE 1

| | Composition [vol %] | | | Composition [vol %] | |
|---|---|---|---|---|---|
| Example 1 | Magnet powder (1): | 77.6 | Example 11 | Magnet powder (5): | 58.0 |
| | Resin A: | 10.9 | | Magnet powder (7): | 25.0 |
| | Antioxidant: | 10.0 | | Resin A: | 10.0 |
| | Lubricant: | 1.5 | | Resin D: | 4.0 |
| | | | | Antioxidant: | 3.0 |
| Example 2 | Magnet powder (2): | 79.1 | Example 12 | Magnet powder (1): | 83.0 |
| | Resin B: | 15.9 | | Resin E: | 15.8 |
| | Antioxidant: | 3.0 | | Lubricant: | 1.0 |
| | Plasticizer: | 2.0 | | | |
| Example 3 | Magnet powder (3): | 80.5 | Example 13 | Magnet powder (1): | 85.0 |
| | Resin C: | 16.0 | | Resin F: | 14.0 |
| | Antioxidant: | 1.0 | | Lubricant: | 1.0 |
| | Lubricant: | 2.5 | | | |
| Example 4 | Magnet powder (1): | 82.1 | Example 14 | Magnet powder (1): | 83.5 |
| | Resin A: | 9.9 | | Resin A: | 10.7 |
| | Antioxidant: | 8.0 | | Antioxidant: | 5.0 |
| | | | | Lubricant: | 0.8 |
| Example 5 | Magnet powder (1): | 84.1 | Example 15 | Magnet powder (1): | 85.0 |
| | Resin A: | 7.9 | | Resin A: | 10.0 |
| | Antioxidant: | 7.0 | | Antioxidant: | 4.0 |
| | Plasticizer: | 0.5 | | Lubricant: | 1.0 |
| | Lubricant: | 0.5 | | | |
| Example 6 | Magnet powder (1): | 86.0 | Comparative Example 1 | Magnet powder (1): | 77.6 |
| | Resin A: | 7.0 | | Resin A: | 15.4 |
| | Antioxidant: | 6.0 | | Antioxidant: | 6.0 |
| | Lubricant: | 1.0 | | Lubricant: | 1.0 |
| Example 7 | Magnet powder (1): | 88.0 | Comparative Example 2 | Magnet powder (1): | 79.1 |
| | Resin A: | 6.0 | | Resin A: | 13.9 |
| | Antioxidant: | 5.0 | | Antioxidant: | 6.0 |
| | plasticizer: | 1.0 | | Lubricant: | 1.0 |
| Example 8 | Magnet powder (1): | 90.0 | Comparative Example 3 | Magnet powder (1): | 82.1 |
| | Resin A: | 4.0 | | Resin A: | 10.9 |
| | Resin D: | 2.0 | | Antioxidant: | 6.0 |
| | Antioxidant: | 3.0 | | Lubricant: | 1.0 |
| | Lubricant: | 1.0 | | | |
| Example 9 | Magnet powder (5): | 82.5 | Comparative Example 4 | Magnet powder (1): | 82.1 |
| | Resin C: | 16.3 | | Resin A: | 10.9 |
| | Lubricant: | 1.2 | | Antioxidant: | 6.0 |
| | | | | Lubricant: | 1.0 |
| Example 10 | Magnet powder (6): | 80.0 | Comparative Example 5 | Magnet powder (1): | 83.0 |
| | Resin A: | 11.5 | | Resin A: | 10.0 |
| | Antioxidant: | 7.0 | | Antioxidant: | 6.0 |
| | Plasticizer: | 1.5 | | Lubricant: | 1.0 |

TABLE 2

| | Kneading Conditions | | | Molding Conditions | | | | | |
|---|---|---|---|---|---|---|---|---|---|
| | | | | Method | Temp. of Heating | Temp. of Tip | Extruding | Extruding | Alignment |
| | Apparatus | Temperature [° C.] | Time [min.] | (Extruding Direction) | Portion (° C.) | Portion [° C.] | Pressure [kg/cm$^2$] | Rate [mm/sec.] | Field [kOe] |
| Example 1 | a | 150–250 | 10 | Screw Extrusion (Vertical) | 250 | 140 | 180 | 10 | Under nonmagnetic field |
| Example 2 | a | 180–300 | 15 | Screw Extrusion (Vertical) | 320 | 160 | 230 | 8 | Under nonmagnetic field |
| Example 3 | a | 200–350 | 20 | Ram Extrusion (Vertical) | 330 | 200 | 370 | 7 | Under nonmagnetic field |
| Example 4 | a | 150–250 | 25 | Ram Extrusion (Vertical) | 250 | 140 | 500 | 6 | Under nonmagnetic field |
| Example 5 | a | 150–250 | 20 | Ram Extrusion (Vertical) | 250 | 140 | 650 | 3 | Under nonmagnetic field |
| Example 6 | a | 150–250 | 20 | Ram Extrusion (Vertical) | 250 | 140 | 730 | 2 | Under nonmagnetic field |
| Example 7 | a | 150–250 | 20 | Ram Extrusion (Vertical) | 250 | 140 | 840 | 1 | Under nonmagnetic field |
| Example 8 | a | 150–250 | 20 | Ram Extrusion (Vertical) | 250 | 100 | 1050 | 0.5 | Under nonmagnetic field |
| Example 9 | a | 200–350 | 25 | Ram Extrusion (Vertical) | 330 | 200 | 550 | 2 | 12 |
| Example 10 | a | 150–250 | 15 | Ram Extrusion (Vertical) | 250 | 140 | 350 | 8 | 15 |

To be continued on Table 3

TABLE 3

| | Kneading Conditions | | | Molding Conditions | | | | | |
|---|---|---|---|---|---|---|---|---|---|
| | Apparatus | Temperature [° C.] | Time [min.] | Method (Extruding Direction) | Temp. of Heating Portion (° C.) | Temp. of Tip Portion [° C.] | Extruding Pressure [kg/cm$^2$] | Extruding Rate [mm/sec.] | Alignment Field [kOe] |
| Example 11 | a | 150–250 | 15 | Ram Extrusion (Vertical) | 250 | 100 | 400 | 7 | 17 |
| Example 12 | b | 80–120 | 50 | Ram Extrusion (Vertical) | 120 | 180 | 1100 | 0.1 | Under nonmagnetic field |
| Example 13 | b | 100–180 | 50 | Ram Extrusion (Vertical) | 160 | 80 | 780 | 4 | Under nonmagnetic field |
| Example 14 | — | — | — | Ram Extrusion (Vertical) | 250 | 140 | 820 | 4 | Under nonmagnetic field |
| Example 15 | — | — | — | Ram Extrusion (Vertical) | 250 | 140 | 900 | 3 | Under nonmagnetic field |
| Comparative Example 1 | a | 150–250 | 15 | Ram Extrusion (Horizontal) | 250 | 140 | 250 | 5 | Under nonmagnetic field |
| Comparative Example 2 | a | 150–250 | 15 | Ram Extrusion (Horizontal) | 250 | 140 | 350 | 3 | Under nonmagnetic field |
| Comparative Example 3 | a | 150–250 | 20 | Screw Extrusion (Horizontal) | 250 | 140 | 650 | 1 | Under nonmagnetic field |
| Comparative Example 4 | a | 150–250 | 20 | Screw Extrusion (Horizontal) | 270 | 140 | Not Moldable | | Under nonmagnetic field |
| Comparative Example 5 | a | 150–250 | 20 | Screw Extrusion (Horizontal) | 270 | 140 | Not Moldable | | Under nonmagnetic field |

TABLE 4

| | Magnet Shape | Magnet Size [mm] | | Magnet Composition [vol %] | | Magnetic Energy Product (BH)max [MGOe] | Density of Molded Article [g/cm$^3$] | Void Ratio [%] | Circularity [$\mu$m] | Straightness [mm] | Corrosion Resistance |
|---|---|---|---|---|---|---|---|---|---|---|---|
| Example 1 | Hollow cylinder | Outer diameter: | 30.0 | Magnet powder (1): | 79.67 | 10.5 | 6.26 | 0.92 | 0.05 | 4.5 | ○ |
| | | Inner diameter: | 29.0 | Resin A: | 11.17 | | | | | | |
| | | | | Antioxidant: | 8.23 | | | | | | |
| Example 2 | Hollow cylinder | Outer diameter: | 25.0 | Magnet powder (2): | 80.43 | 8.6 | 6.35 | 0.73 | 0.04 | 3.3 | ○ |
| | | Inner diameter: | 23.0 | Resin B: | 16.15 | | | | | | |
| | | | | Antioxidant: | 2.69 | | | | | | |
| | | | | Plasticizer: | trace | | | | | | |
| Example 3 | Hollow cylinder | Outer diameter: | 20.0 | Magnet powder (3): | 81.48 | 8.8 | 6.41 | 1.38 | 0.02 | 2.5 | ○ |
| | | Inner diameter: | 17.0 | Resin C: | 16.21 | | | | | | |
| | | | | Antioxidant: | 0.92 | | | | | | |
| | | | | Lubricant: | trace | | | | | | |
| Example 4 | Hollow cylinder | Outer diameter: | 24.0 | Magnet powder (4): | 83.15 | 8.1 | 6.47 | 1.00 | 0.01 | 2 | ○ |
| | | Inner diameter: | 20.0 | Resin A: | 10.02 | | | | | | |
| | | | | Antioxidant: | 5.83 | | | | | | |
| | | | | Lubricant: | trace | | | | | | |
| Example 5 | Hollow cylinder | Outer diameter: | 16.0 | Magnet powder (1): | 85.58 | 11.9 | 6.66 | 1.34 | 0.01 | 1.2 | ○ |
| | | Inner diameter: | 10.0 | Resin A: | 8.10 | | | | | | |
| | | | | Antioxidant: | 4.98 | | | | | | |
| | | | | Plasticizer-Lubricant: | trace | | | | | | |

To be continued on Table 5

TABLE 5

| | Magnet Shape | Magnet Size [mm] | | Magnet Composition [vol %] | | Magnetic Energy Product (BH)max [MGOe] | Density of Molded Article [g/cm$^3$] | Void Ratio [%] | Circularity [$\mu$m] | Straightness [mm] | Corrosion Resistance |
|---|---|---|---|---|---|---|---|---|---|---|---|
| Example 6 | Hollow cylinder | Outer diameter: | 18.0 | Magnet powder (1): | 87.14 | 12.4 | 6.73 | 1.49 | 0.02 | 3.2 | ○ |
| | | Inner diameter: | 12.0 | Resin A: | 7.13 | | | | | | |
| | | | | Antioxidant: | 4.24 | | | | | | |
| | | | | Lubricant: | Trace | | | | | | |
| Example 7 | Round Rod | Outer diameter: | 15.0 | Magnet powder (1): | 88.14 | 12.9 | 6.78 | 1.85 | 0.03 | 3.3 | ○ |
| | | | | Resin A: | 5.98 | | | | | | |
| | | | | Antioxidant: | 4.03 | | | | | | |
| | | | | Plasticizer: | Trace | | | | | | |

TABLE 5-continued

| | Magnet Shape | Magnet Size [mm] | Magnet Composition [vol %] | Magnetic Energy Product (BH)max [MGOe] | Density of Molded Article [g/cm$^3$] | Void Ratio [%] | Circularity [$\mu$m] | Straightness [mm] | Corrosion Resistance |
|---|---|---|---|---|---|---|---|---|---|
| Example 8 | Round Rod | Outer diameter: 18.0 | Magnet powder (1): 89.47<br>Resin A: 3.97<br>Resin D: 1.96<br>Antioxidant: 2.60<br>Lubricant: Trace | 14.0 | 6.86 | 2.00 | 0.04 | 4.1 | ○ |
| Example 9 | Hollow cylinder | Outer diameter: 18.0<br>Inner diameter: 15.0 | Magnet powder (5): 82.53<br>Resin C: 16.31<br>Antioxidant: Trace | 15.5 | 7.25 | 1.16 | 0.01 | 1.4 | ⊙ |
| Example 10 | Hollow cylinder | Outer diameter: 22.0<br>Inner diameter: 19.5 | Magnet powder (6): 81.05<br>Resin A: 11.67<br>Antioxidant: 6.27<br>Plasticizer: Trace | 14.0 | 6.33 | 1.01 | 0.02 | 2.2 | ○ |

To be continued on Table 6

TABLE 6

| | Magnet Shape | Magnet Size [mm] | Magnet Composition [vol %] | Magnetic Energy Product (BH)max [MGOe] | Density of Molded Article [g/cm$^3$] | Void Ratio [%] | Circularity [$\mu$m] | Straightness [mm] | Corrosion Resistance |
|---|---|---|---|---|---|---|---|---|---|
| Example 11 | Hollow cylinder | Outer diameter: 30.0<br>Inner diameter: 27.5 | Magnet powder (5): 57.53<br>Magnet powder (7): 24.79<br>Resin A: 9.95<br>Resin D: 3.97<br>Antioxidant: 2.50 | 16.2 | 6.95 | 1.25 | 0.02 | 2.9 | ⊙ |
| Example 12 | Hollow cylinder | Outer diameter: 40.0<br>Inner diameter: 38.0 | Magnet powder (1): 82.38<br>Resin E: 15.66<br>Plasticizer: Trace | 11.4 | 6.41 | 1.96 | 0.01 | 0.4 | ○ |
| Example 13 | Round Rod | Outer diameter: 14.0 | Magnet powder (1): 84.27<br>Resin F: 13.88<br>Lubricant: Trace | 12.2 | 6.57 | 1.85 | 0.02 | 2.7 | ○ |
| Example 14 | Hollow cylinder | Outer diameter: 14.0<br>Inner diameter: 11.0 | Magnet powder (1): 83.02<br>Resin A: 10.61<br>Antioxidant: 4.47<br>Lubricant: Trace | 11.7 | 6.44 | 1.90 | 0.03 | 3.4 | ○ |
| Example 15 | Hollow cylinder | Outer diameter: 12.0<br>Inner diameter: 6.0 | Magnet powder (1): 84.55<br>Resin A: 9.94<br>Antioxidant: 3.59<br>Lubricant: Trace | 12.1 | 6.54 | 1.92 | 0.04 | 3.9 | ○ |

To be continued on Table 7

TABLE 7

| | Magnet Shape | Magnet Size [mm] | Magnet Composition [vol %] | Magnetic Energy Product (BH)max [MGOe] | Density of Molded Article [g/cm$^3$] | Void Ratio [%] | Circularity [$\mu$m] | Straightness [mm] | Corrosion Resistance |
|---|---|---|---|---|---|---|---|---|---|
| Comparative Example 1 | Hollow cylinder | Outer diameter: 22.0<br>Inner diameter: 18.0 | Magnet powder (1): 78.32<br>Resin A: 15.56<br>Antioxidant: 4.82<br>Lubricant: Trace | 10.0 | 6.15 | 1.30 | 0.07 | 5.8 | ○ |
| Comparative Example 2 | Hollow cylinder | Outer diameter: 30.0<br>Inner diameter: 29.0 | Magnet powder (1): 79.98<br>Resin A: 14.05<br>Antioxidant: 4.85<br>Lubricant: Trace | 10.6 | 6.26 | 1.12 | 0.08 | 6.7 | ○ |
| Comparative Example 3 | Round Rod | Outer diameter: 15.0 | Magnet powder (1): 82.40<br>Resin A: 10.93<br>Antioxidant: 4.79<br>Lubricant: Trace | 11.5 | 6.41 | 1.88 | 0.07 | 7.3 | ○ |
| Comparative Example 4 | Hollow cylinder | Outer diameter: 24.0<br>Inner diameter: 20.0 | | | Not Moldable | | | | |
| Comparative Example 5 | Round Rod | Outer diameter: 18.0 | | | Not Moldable | | | | |

TABLE 8

| | Resin | Amount of Magnet Powder (vol %) | Amount of Resin (vol %) | Linear Expansion Coefficient ($10^{-5}$/° C.) |
|---|---|---|---|---|
| Example 2 | PPS | 79.1 | 15.9 | 2.91 |
| Example 3 | Liquid Crystal Polymer | 80.5 | 16.0 | 2.58 |
| Example 12 | Epoxy Resin | 83.0 | 15.8 | 3.44 |
| Comparative Example 3 | Nylon 12 | 82.1 | 10.9 | 4.73 |

What is claimed is:

1. A method for manufacturing a rare earth bonded magnet, comprising extruding a rare earth bonded magnet composition containing a rare earth bonded magnet powder and a binder resin using a vertical ram extruder, wherein the extruding direction by said extruder is vertical.

2. The method for manufacturing a rare-earth bonded magnet according to claim 1, wherein the content of said rare-earth magnet powder in said rare-earth-bonded-magnet composition is 77.6 to 90.0 vol %.

3. The method for manufacturing a rare-earth bonded magnet according to claim 1, wherein said rare-earth magnet powder contains, as the main ingredients, rare-earth elements principally including Sm, and transition metals principally including Co.

4. The method for manufacturing a rare-earth bonded magnet according to claim 1, wherein said rare-earth magnet powder contains, as the main ingredients, R (at least one element selected from rare-earth element including Y), and transition metals principally including Fe, and B.

5. The method for manufacturing a rare-earth bonded magnet according to claim 1, wherein said rare-earth magnet powder contains, as the main ingredients, rare-earth elements principally including Sm, transition metals principally including Fe, and interstitial elements principally including N.

6. The method for manufacturing a rare-earth bonded magnet according to claim 1, wherein the extruding direction in extrusion-molding is downward-vertical.

7. A method for manufacturing a rare earth bonded magnet, comprising extruding a rare earth bonded magnet composition containing a rare earth magnet powder, a binder resin and an antioxidant using a vertical ram extruder, wherein the extruding direction by said extruder is vertical.

8. The method for manufacturing a rare-earth bonded magnet according to claim 7, wherein the total content of said binder resin and said antioxidant in said rare-earth-bonded-magnet composition is 10.0 to 22.4 vol %.

9. The method for manufacturing a rare-earth bonded magnet according to claim 8, wherein the content of said antioxidant in said rare-earth-bonded-magnet composition is 1.0 to 12.0 vol %.

10. The method for manufacturing a rare-earth bonded magnet according to claim 7, wherein the content of said antioxidant in said rare-earth-bonded-magnet composition is 1.0 to 12.0 vol %.

11. The method for manufacturing a rare-earth bonded magnet according to claim 7, wherein the content of said rare-earth magnet powder in said rare-earth-bonded-magnet composition is 77.6 to 90.0 vol %.

12. The method for manufacturing a rare-earth bonded magnet according to claim 7, wherein said rare-earth magnet powder contains, as the main ingredients, rare-earth elements principally including Sm, and transition metals principally including Co.

13. The method for manufacturing a rare-earth bonded magnet according to claim 11, wherein said rare-earth magnet powder contains, as the main ingredients, R (at least one element selected from rare-earth element including Y), and transition metals principally including Fe, and B.

14. The method for manufacturing a rare-earth bonded magnet according to claim 7, wherein said rare-earth magnet powder contains, as the main ingredients, rare-earth elements principally including Sm, transition metals principally including Fe, and interstitial elements principally including N.

15. The method for manufacturing a rare-earth bonded magnet according to claim 7, wherein the extruding direction in extrusion-molding is downward-vertical.

16. A method for manufacturing a rare earth bonded magnet containing a rare earth magnet powder and a binder resin, comprising:

- a step of mixing a rare earth magnet powder and a binder resin to obtain a rare earth bonded magnet composition;
- an extrusion molding step in which said rare earth bonded magnet composition is vertically extruded using a vertical ram extruder to obtain a long molded body; and
- a step of cutting said extrusion molded long body, wherein in said extrusion molding step, said binder resin which has been melted or softened is solidified in the outlet portion of a die.

17. The method for manufacturing a rare-earth bonded magnet according to claim 16, wherein said rare-earth magnet powder contains, as the main ingredients, rare-earth elements principally including Sm, and transition metals principally including Co.

18. The method for manufacturing a rare-earth bonded magnet according to claim 16, wherein said rare-earth magnet powder contains, as the main ingredients, R (at least one element selected from rare-earth element including Y), and transition metals principally including Fe, and B.

19. The method for manufacturing a rare-earth bonded magnet according to claim 16, wherein said rare-earth magnet powder contains, as the main ingredients, rare-earth elements principally including Sm, transition metals principally including Fe, and interstitial elements principally including N.

20. The method for manufacturing a rare-earth bonded magnet according to claim 16, wherein the extruding direction in extrusion-molding is downward-vertical.

21. A method for manufacturing a rare earth bonded magnet containing a rare earth magnet powder and a binder resin, comprising:

- a step of mixing a rare earth magnet powder and a binder resin;
- a step of kneading the thus obtained mixture to obtain a rare earth bonded magnet composition;
- an extrusion molding step in which said rare earth bonded magnet composition is vertically extruded using a vertical ram extruder to obtain a long molded body; and a step of cutting said extrusion molded long body, wherein, in said extrusion molding step, said binder resin which has been melted or softened is solidified in the outlet portion of a die.

22. The method for manufacturing a rare-earth bonded magnet according to claim 21, wherein said rare-earth-bonded-magnet composition comprises blobs or granules of the kneaded mixture.

23. A rare-earth bonded magnet manufactured according to claim 1.

24. The rare-earth bonded magnet according to claim 23, wherein said rare-earth bonded magnet has a void ratio of 2 vol % or below.

25. The rare-earth bonded magnet according to claim 23, wherein said rare-earth bonded magnet has a round-rod shape or a hollow cylindrical shape, and a periphery circularity of 5/100 mm or below [wherein, Roundness=(Maximum Outer Diameter−Minimum Outer Diameter)×1/2].

26. A method for manufacturing a rare-earth bonded magnet containing a rare-earth magnet powder and a binder resin, comprising:

mixing a rare-earth magnet powder and a binder resin to obtain a rare-earth bonded magnet composition;

feeding the composition from a hopper into a cylinder through a feeding pipe;

vibrating the feeding pipe using a vibrator such that the composition is smoothly fed;

driving a cylinder using a driving unit in accordance with a pre-programmed pattern such that a ram piston is extended and moved downward to compact the composition;

heating a heating portion and a die to a predetermined temperature such that as the composition is transferred downward, the composition is heated to a temperature equal to or higher than the melting temperature of the binder resin, thereby melting the composition;

continuously extruding the melted composition through the die such that the composition is molded into a predetermined shape;

cooling the melted composition as it passes through a tip portion, thus solidifying the binder resin to obtain a molded body; and cutting said molded body to obtain rare-earth bonded magnets.

27. The method for manufacturing a rare earth bonded magnet according to claim 26, wherein the content of said rare earth magnet powder in said rare earth bonded magnet composition is 77.6–90 vol %.

28. The method for manufacturing a rare earth bonded magnet according to claim 26, wherein said rare earth magnet powder contains, as the main ingredients, rare earth elements principally including Sm, and transition metals principally including Co.

29. The method for manufacturing a rare earth bonded magnet according to claim 26, wherein said rare earth magnet powder contains, as the main ingredients, R (at least one element selected from rare earth elements including Y), and transition metals principally including Fe, and B.

30. The method for manufacturing a rare earth bonded magnet according to claim 26, wherein said rare earth magnet powder contains, as the main ingredients, rare earth elements principally including Sm, transition metals principally including Fe, and interstitial elements principally including N.

31. The method for manufacturing a rare earth bonded magnet according to claim 26, wherein said rare earth bonded magnet further includes an antioxidant with a content of 1.0 to 12.0 vol %.

32. A rare earth bonded magnet manufactured according to claim 26.

* * * * *

UNITED STATES PATENT AND TRADEMARK OFFICE

CERTIFICATE OF CORRECTION

PATENT NO. : 6,500,374 B1
DATED : December 31, 2002
INVENTOR(S) : Akioka et al.

It is certified that error appears in the above-identified patent and that said Letters Patent is hereby corrected as shown below:

Column 3,
Line 49, “avoid” should be -- a void --;

Column 4,
Line 47, “$Sm_2TM_7$” should be -- $Sm_2TM_{17}$ --;

Column 5,
Lines 55-56, “copolymerizedresins” should be -- copolymerized resins --;

Column 6,
Line 6, after “may” insert -- be --;

Column 8,
Line 14, after “magnetic” insert -- powder --;

Column 9,
Line 29, after “shaft” insert a period;
Line 34, “mm/sdc.” should be -- mm/sec. --;

Column 10,
Line 16, after “die 4” insert a period;
Line 38, delete “At”;

Column 12,
Line 3, “$CoO_{0.604}$” should be -- $Co_{0.0604}$ --.

Signed and Sealed this

Twenty-eighth Day of October, 2003

JAMES E. ROGAN
*Director of the United States Patent and Trademark Office*